(12) United States Patent
Ingles

(10) Patent No.: US 7,160,098 B2
(45) Date of Patent: Jan. 9, 2007

(54) STRING HOPPER MAKING MACHINE

(76) Inventor: Rudland Eward Ingles, 40 Donaldson Road, Holland Landing, Ontario (CA) L9N 1J1

( * ) Notice: Subject to any disclaimer, the term of this patent is extended or adjusted under 35 U.S.C. 154(b) by 323 days.

(21) Appl. No.: 10/816,035

(22) Filed: Apr. 2, 2004

(65) Prior Publication Data

US 2005/0220922 A1    Oct. 6, 2005

(51) Int. Cl.
*B29C 47/08*    (2006.01)
(52) U.S. Cl. ............ 425/318; 425/382 R; 425/412; 100/293; 99/349; 426/517
(58) Field of Classification Search ......... 425/318, 425/382 R, 412; 100/293; 99/349; 426/517
See application file for complete search history.

(56) References Cited

U.S. PATENT DOCUMENTS

| 268,088 | A | * | 11/1882 | Evers | 100/219 |
|---|---|---|---|---|---|
| 805,566 | A | * | 11/1905 | Liddle | 100/257 |
| 1,607,880 | A | * | 11/1926 | Dungan | 425/190 |
| 1,639,791 | A | * | 8/1927 | Baccellieri | 425/190 |
| 1,757,447 | A | * | 5/1930 | Comstock | 425/89 |
| 2,219,889 | A | * | 10/1940 | Federighi et al. | 425/89 |
| 2,351,493 | A | * | 6/1944 | Curry | 425/188 |
| 2,617,169 | A | * | 11/1952 | Bodkin | 264/204 |
| 4,092,205 | A | * | 5/1978 | Mieszczak | 156/499 |
| 4,465,452 | A | * | 8/1984 | Masuzawa | 425/308 |
| 4,496,510 | A | * | 1/1985 | Hanson et al. | 264/257 |
| 6,134,906 | A | * | 10/2000 | Eastman | 62/331 |

FOREIGN PATENT DOCUMENTS

CA    2296024    *    7/2001

* cited by examiner

*Primary Examiner*—Joseph S. Del Sole
(74) *Attorney, Agent, or Firm*—David W. Wong

(57) ABSTRACT

A string hopper making machine has a dough container removably mounted in a vertical manner in a frame. An extrusion piston is mounted on a vertical rod extending through a vertical guide channel formed in a guiding block mounted on the frame. The vertical rod is pivotally mounted to a front end of a lever arm which has a rear end pivotally mounted to a pivot arm of a pivot block rotatable relative to the frame. An elongated handle rod is mounted at a front end of the lever arm and is operative for pivoting the lever arm for moving the piston in an up and down vertical direction for mounting the dough container to the frame and for extruding the dough mixture from the dough container to form the string hopper.

4 Claims, 4 Drawing Sheets

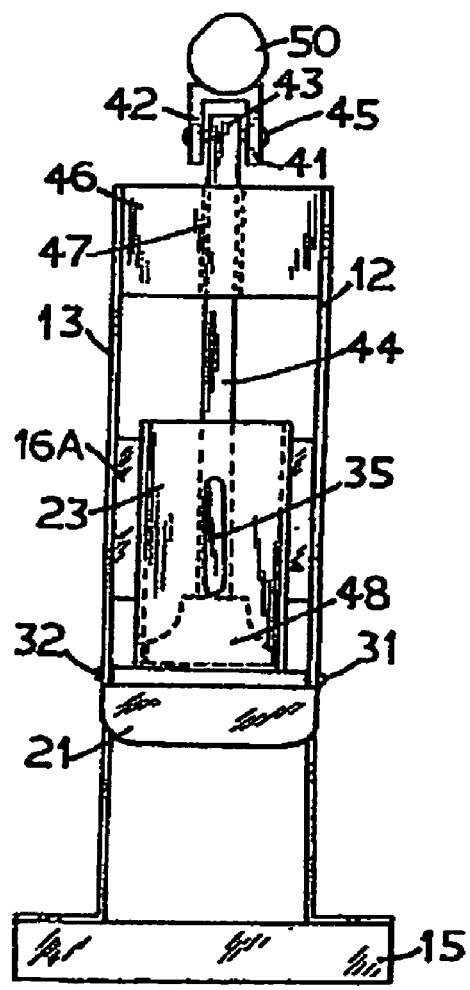
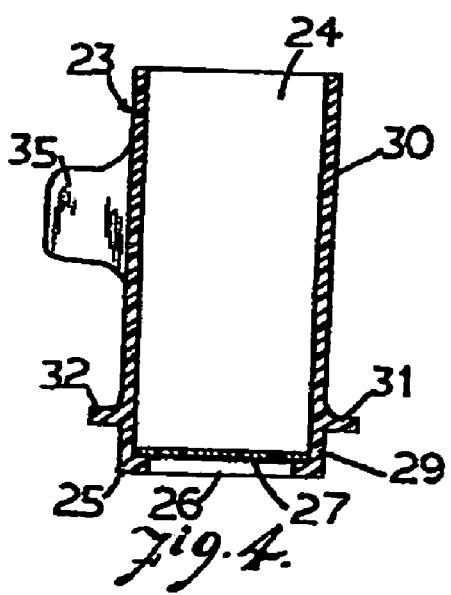
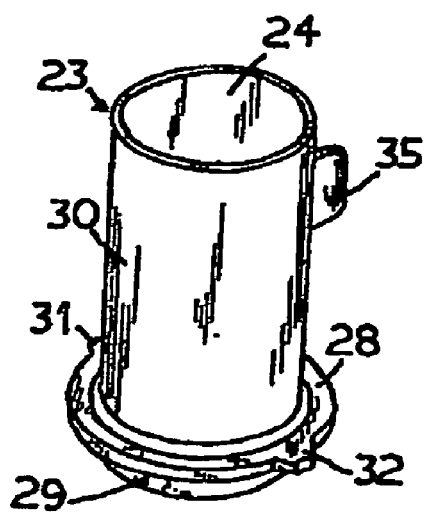

STRING HOPPER MAKING MACHINE

FIELD OF INVENTION

This invention relates to a noodle making machine and more specifically to a machine operative for making East Asian noodle called string hopper.

BACKGROUND OF THE INVENTION

String hopper is special type of noodle made from a mixture of different rice flours and it is widely consumed in south east Asia such as India and Sri Lanka. This string hopper is commonly made with a handheld hand-made wooden device consisting of a small cup having a cylindrical through bore extending from its top to bottom. A metal plate with a plurality of openings formed therein is mounted with screws at the bottom of the cup so that the bore forms a cylindrical well therein for holding the rice dough. The cup has two arms extending outwards from its two opposite sides. A wooden cylindrical plunger having the complementary size as the well is mounted on a carrier which also has two opposite side arms similar to the cup. The device is operated by placing the rice dough into the well of the cup and then inserting the plunger into the well and squeezing the arms of the plunger and the cup tightly towards on another by hands so as to extrude the dough through the plate with the plunger to form the string hopper. While extruding the string hopper, the operator must also move the device in a circular motion so as to deposit the string hopper onto a steam tray for its subsequent cooking. A relatively large pressure must be exerted between the plunger and the cup in the operation, which requires a high degree of dexterity and effort to carry out Furthermore, the device is unsanitary since it is difficult to clean any dough remnant from the wooden well and between the well and the metal plate. The remnant would breed harmful bacteria.

A desk top machine for making string hopper is shown in Canadian patent application No. 2,296,024 by S. Selvadurai which was published on Jul. 12, 2001. The machine shown therein provides a worm gear mechanism which has a hand-operated crank handle for driving a piston into a cylinder containing the rice dough for making the string hopper. The machine is difficult to operate since the operator must crank the handle in a rotary motion in one direction while having to move the string hopper receiving steam tray below the machine in a circular motion in another direction. The movement of two hands in circular motion in different directions is very awkward to carry out. Furthermore, since the worm gear mechanism are located directly above the cylinder and the steam tray, particles and lubricating material of the worm gear would invariably fall into the cylinder as well as onto the steam tray during the operation to contaminate the string hopper.

SUMMARY OF THE INVENTION

It is the principal object of the present invention to provide a string hopper making machine which is easy to operate and no contaminant can fall from the machine to the string hopper in its operation.

It is another object of the present invention to provide a string hopper making machine in which the piston for extruding the rice dough from the well operates in a completely vertically direction to provide an efficient and effective string hopper extrusion.

It is yet another object of the present invention to provide a string hopper making machine having a dough container which is removably mounted on the machine and it is made of a food safe plastic material for easy cleaning.

BRIEF DESCRIPTION OF THE DRAWINGS

Other objects and advantages of the present invention will become apparent from the following detailed description of the preferred embodiments thereof in connection with the accompanying drawings in which

FIG. 2 is a front elevation view of the machine with the dough container mounted therein and with the extrusion piston, shown in dotted line, located at the lower position within the dough container.

FIG. 3 is a perspective elevation view of the generally cylindrical dough container thereof.

FIG. 4 is a sectional side elevation view of the dough container.

DETAILED DESCRIPTION OF THE PREFERRED EMBODIMENTS

Figure 1:
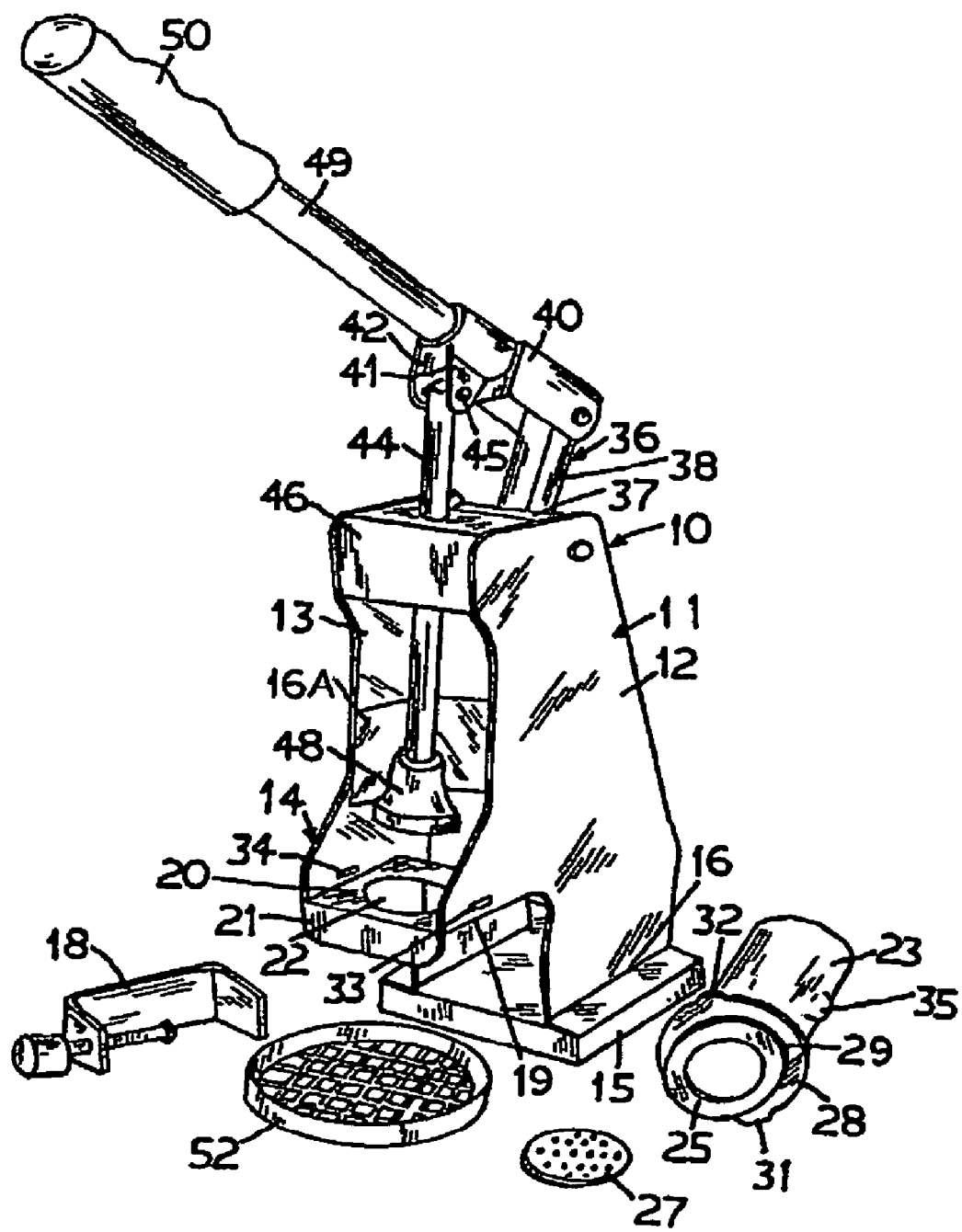
FIG. 1 is a general perspective elevation view of the string hopper machine and its component parts, of the present invention.
Figure 5:
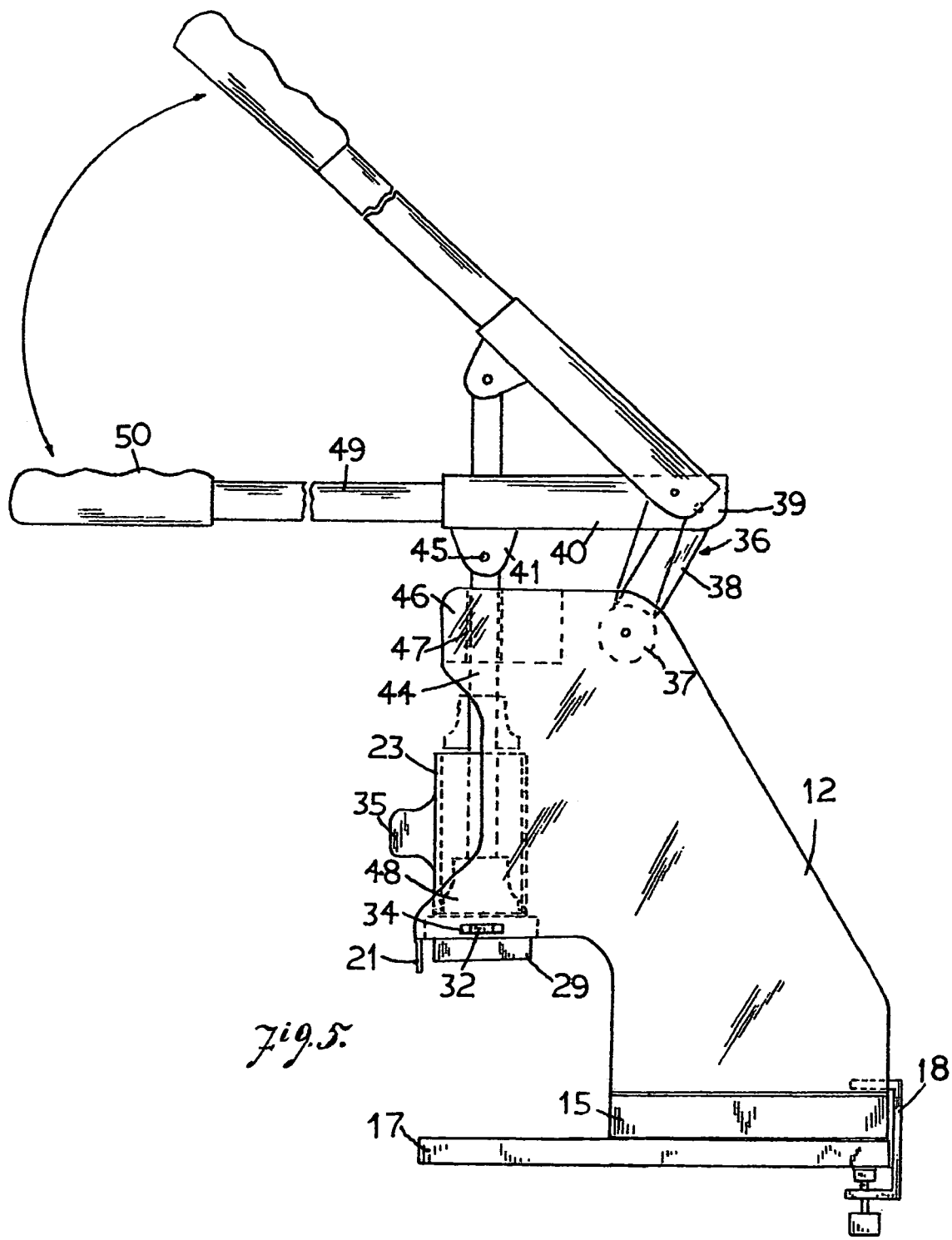
FIG. 5 is a side elevation view of the machine showing the operation of the operating lever for raising and lowering the extrusion piston vertically from the dough container.

With reference to the drawings wherein like reference numerals designate corresponding parts in the several views, the string hopper machine 10 of the present invention has a generally inverted L-shaped frame 11 having two spaced mutually parallel side plates 12 and 13. The frame 11 has a front extension portion 14, and a base plate 15 mounted to the bottom end 16 of the side plates 12 and 13. A reinforced brace 16A is mounted between the side plates 12 and 13 to provide further rigidity to the frame 11. The machine 10 may be securely mounted to a supporting surface such as a table top 17 with a C-clamp 18 as best shown in FIG. 5. The front extension portion 14 has a lower edge 19 extending forward from the frame 11 and spaced above the table top 17. A horizontal dough container support plate 20 is located at the lower edge 19 of the extension portion 14. The support plate 20 may be provided with a skirting plate 21 extending vertically downwards from its front edge. A container mounting opening 22 is formed in the support plate 20.

A cylindrical dough container 23 made of a food safe material such as ABS plastic may be removably mounted on the machine 10. The dough container 23 has a cylindrical well 24 and a smaller diameter circular shoulder 25 formed at its lower opening 26. A string hopper forming extrusion plate 27 is removably mounted at the lower opening 26 by resting on the shoulder 25. A circular ridge 28 is formed adjacent to the lower end of the dough container 23 to separate the lower portion 29 and the upper portion 30 of the dough container 23. The circular ridge 28 has two tabs 31 and 32 extending outwards from two directly opposite sides of the dough container 23. Alternately, the lower portion of the dough container 23 may have a smaller diameter with mounting threads formed on its circular outer surface, and a ring shaped cap having the same diameter as the dough container 23, and having a smaller lower opening, may be threadingly mounted to the lower portion of the dough container. The extrusion plate 27 may be held in place between the cap and the dough container and it may be easily removed for cleaning purposes. The lower portion 29 of the dough container 23 has a diameter slightly smaller than the mounting opening 22 of the support plate 20. The dough container 23 may be removably mounted to the support plate 20 by inserting its lower portion 29 into the mounting opening 22 until the circular ridge 28 is resting on the edge of the container mounting opening 22; and then the container 23 is further turned until the tabs 31 and 32 engage with latching openings 33 and 34 formed in the side plates 12 and 13 respectively so as to maintain the dough container 23 securely mounted in a vertical position in the frame 11. A handle 35 is formed on the outer side wall of the dough container 23 to facilitate its location in and removal from the frame 11.

An inverted T-shaped pivot block 36 is rotatably mounted at the top rear of the frame 11. The pivot block 36 consists of a horizontal rod 37 having a pivot arm 38 extending in a perpendicular manner at its middle. The horizontal rod 37 is rotatably mounted between the side plates 12 and 13 with the pivot arm 38 extending upwards from the frame 11 and it is pivotable in a back and forth direction relative to the frame 11. The top end of the pivot arm 38 is pivotally mounted to an end portion 39 of a lever arm 40 such that the lever arm 40 may be pivoted up and down relative to the frame 11. Two substantially semi-circular plates 41 and 42 are located at the lower surface of the front end portion of the lever arm 40 and extending downwardly therefrom to form an inverted U-shaped bracket. The upper end 43 of a piston rod 44 is pivotally mounted to the semi-circular plates 41 and 42 of the inverted U-shaped bracket with a cross pin 45 such that the piston rod 44 may be moved up and down relative to the frame 11 by pivoting the lever arm 40 up and down. A guide block 46 is mounted at the top front of the frame 11. The piston rod 44 extends through a vertical through channel 47 formed in the guide block 46 such that the piston rod 44 always moves in a perfectly vertical manner when operated by the lever arm 40. The lever arm 40 is pushed and pulled back and forth by the pivot arm 36 during the operation of the lever arm 40 to ensure the smooth vertical movement of the piston rod 44. An extrusion piston 48 is removably mounted at the lower end of the piston rod 44 such as by thread mounting and it may also be made of food safe ABS plastic so that it may be easily removed for cleaning purposes. The piston 48 has a circular diameter equal to that of the well 24 of the dough container 23 such that it may be intimately and slidably engaged within the well 24. The piston 48 is preferably bell shaped as shown to provide a better distribution of the extrusion force when pressing on the dough mixture in the dough container 23.

An elongated handle rod 49 is mounted to the front end of the lever arm 40 and it is operative to facilitate the easy pivoting of the lever arm 40 up and down relative to the frame 11 as best shown in FIG. 5 for moving the piston 48 shown in dotted lines to an upper position to facilitate the mounted of the dough container 23 to the frame 11, and to a lower position at the lower end of the dough container 23 for extruding the string hopper. A hand grip 50 having a wavy upper profile may be mounted at the front end of the handle rod 49 for easy and comfortable operation of the handle rod 49. The precise vertical movement of the piston rod 44 ensures the pivot force of the handle rod 49 is efficiently applied to the piston 48 for extruding the string hopper. Thus, the extrusion operation can be carried out with ease.

Figure 6:
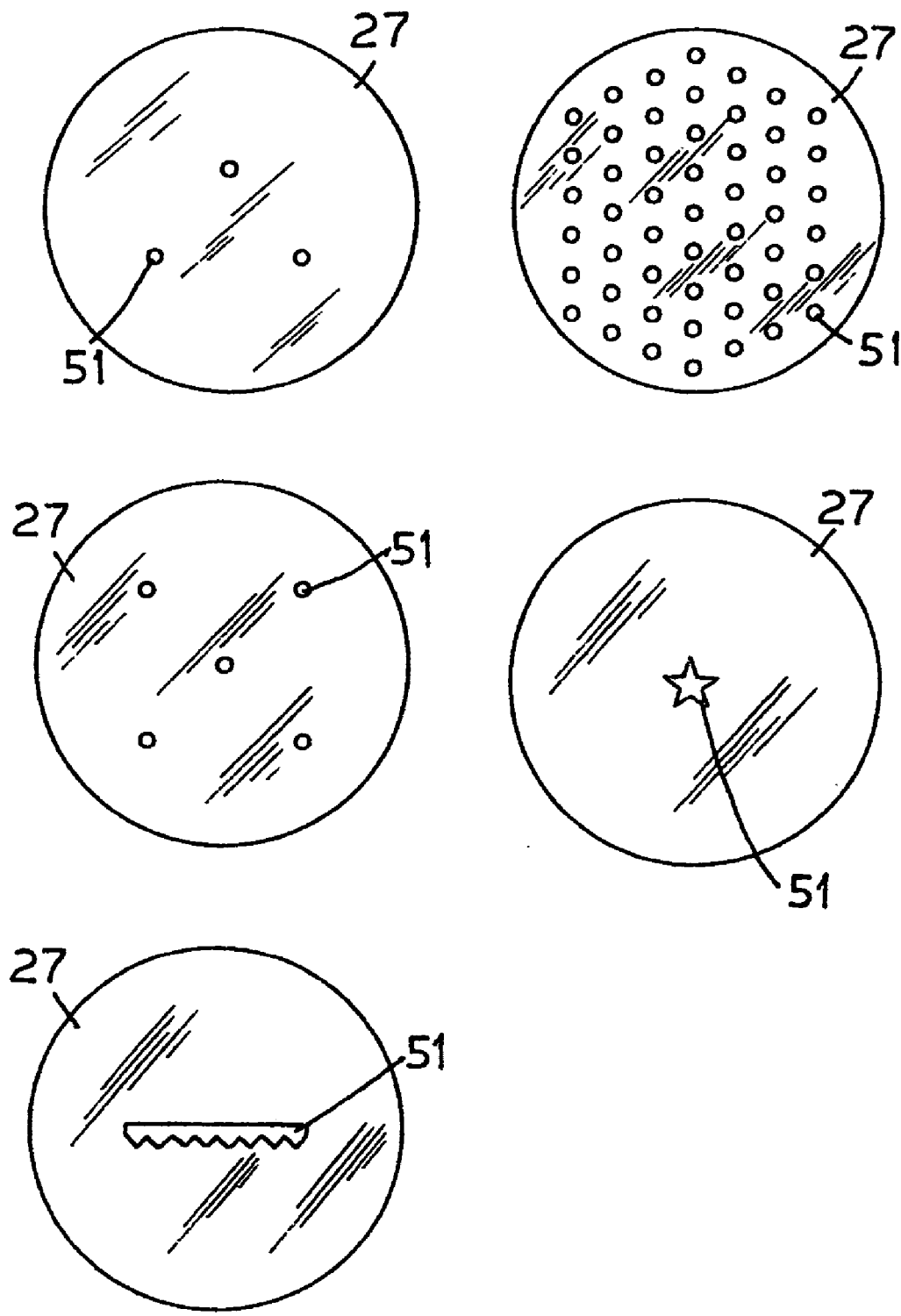
FIG. 6 shows extrusion plates having openings of various configurations for making string hoppers of various selected shapes.

Extrusion plates 27 having various different configurations of extrusion openings 51 such as those shown in FIG. 6 may be provided interchangeably for making string hopper or other pastas of various selected shapes.

In operation, the rice dough is first placed in the dough container 23, and the handle rod 49 is pivoted upwards to move the piston 48 to its upper position so that the dough container 23 may be mounted in the frame 11 by engaging its lower portion 29 with the opening 22 of the support plate 20 and then turning it until the mounting tabs 31 and 32 engage with the latching openings 33 and 34 to secure the dough container 23 firmly in the vertical manner in the frame 11. The piston 48 may then be pressed downwards to engage it with the well 24 and then further pressing downwards by further pivoting the handle rod 49 downwards so as to extrude the string hopper from the dough container 23. The cooperative movements of the pivot block 36 and the lever arm 40 enable the piston rod 44 to move in a perfectly vertical manner through the vertical channel 47 of the guide block 46 such that the extrusion force is exerted vertically on the piston 48 with a high efficiency. A steam tray 52 may be located below the front extension portion 14 of the frame 11 or moved in a circular motion by hand below the front extension portion 14 to receive the string hopper such that it may be readily cooked subsequently.

Due to the perfectly vertical movement of the piston rod 44 and the vertical force exerting on the piston 48 during operation, the piston 48 efficiently extrudes the string hopper from the dough container 23 with a minimum force, and since no wearable parts are located above the dough container 23 or the steam tray 52, no contaminant will fall onto the string hopper.

While the preferred embodiments of the invention have been described above, it will be recognized and understood that various modifications may be made therein and the appended claims are intended to cover all such modifications which may fall within the spirit and scope of the invention.

What I claim is:

1. A string hopper making machine comprising,
   a cylindrical dough container removably mounted in a vertical manner in a generally L-shaped frame having two spaced mutually parallel vertical side plates with a front extension portion extending forward from said frame, said container having a cylindrical well with a circular inside shoulder having a smaller diameter than said well and formed at a bottom opening therein,
   a horizontal support plate fixedly mounted to a lower edge of said extension portion,
   a container mounting opening formed in said support plate and adapted to engage with a lower portion of said container for mounting said container to said support plate;
   an extrusion plate removably located within said well and resting on said shoulder, said extrusion plate having extrusion openings of a selected configuration formed therein,
   a piston mounted on a vertical rod extending slidably in a vertical manner through a vertical channel in a guide block mounted on said frame, said rod having an upper end pivotally mounted to a front end of a lever arm, said piston adapted to engage slidably within said well,
   an inverted T-shaped pivot block rotatably mounted at a top portion of said frame, said pivot block having a horizontal rod with a pivot arm extending perpendicular to a middle location therein, said pivot arm having an upper free end pivotally mounted an end of a lever arm, an inverted U-shaped bracket formed at a lower surface of a front end of said lever arm, and said upper end of said vertical rod being pivotally mounted to said front end of said U-shaped bracket 2. A string hopper machine according to claim 1 including an elongated handle rod mounted at a front end of said lever arm and operative for pivoting said arm to move said piston slidably up and down said well of said dough container for extruding the string hopper.

3. A string hopper making machine according to claim 2 including two latching openings formed in said two side plates of said frame, said dough container having an outer circular ridge formed between an upper portion and said lower portion therein, two tabs formed at two directly opposite sides of said ridge and adapted to engage with said latching openings of said side plates by turning said container for maintaining said dough container securely and removably mounted in a vertical manner in said frame.

4. A string hopper making machine according to claim 3 wherein said dough container is made of food safe ABS plastic and a handle is formed on an outer side wall therein adapted for facilitating mounting and removing said dough container onto said frame.

* * * * *